United States Patent [19]

Rose et al.

[11] Patent Number: 4,505,827
[45] Date of Patent: Mar. 19, 1985

[54] TRIBLOCK POLYMERS OF THE BAB TYPE HAVING HYDROPHOBIC ASSOCIATION CAPABILITIES FOR RHEOLOGICAL CONTROL IN AQUEOUS SYSTEMS

[75] Inventors: Gene D. Rose; Kent S. Dennis; Syamalarao Evani, all of Midland, Mich.

[73] Assignee: The Dow Chemical Company, Midland, Mich.

[21] Appl. No.: 533,400

[22] Filed: Sep. 19, 1983

[51] Int. Cl.³ .............................................. E21B 43/20
[52] U.S. Cl. .................................. 252/8.55 R; 252/1; 252/8.55 D; 252/74; 525/404; 526/173; 526/346
[58] Field of Search ...................... 252/8.55 R, 8.55 D, 252/1, 74; 525/404; 526/173, 346

[56] References Cited

U.S. PATENT DOCUMENTS

| | | | |
|---|---|---|---|
| 3,629,371 | 12/1971 | Winkler . | |
| 3,948,783 | 4/1976 | Szabo et al. | 252/8.55 D |
| 3,984,333 | 10/1976 | van de Kraats et al. | 252/8.55 D |
| 4,110,232 | 8/1978 | Schwab et al. | 252/8.55 B |
| 4,196,236 | 4/1980 | Lundberg et al. . | |
| 4,222,881 | 9/1980 | Byham et al. | 252/8.55 D |
| 4,242,474 | 12/1980 | Shinohara et al. | 525/404 |
| 4,277,582 | 7/1981 | Mueller et al. | 525/404 X |

*Primary Examiner*—Leland A. Sebastian

[57] ABSTRACT

The rheology of aqueous liquids is effectively controlled by the addition to the liquid of a water-dispersible BAB triblock polymer wherein the B blocks are hydrophobic blocks such as alkyl or sulfonated poly(t-butylstyrene) and the A block is a hydrophilic block such as sulfonated poly(vinyltoluene).

17 Claims, No Drawings

TRIBLOCK POLYMERS OF THE BAB TYPE HAVING HYDROPHOBIC ASSOCIATION CAPABILITIES FOR RHEOLOGICAL CONTROL IN AQUEOUS SYSTEMS

BACKGROUND OF THE INVENTION

This invention relates to hydrophobic association polymers and to their use in aqueous media for viscosity enhancement.

As taught in *Handbook of Water-Soluble Gums and Resins*, McGraw-Hill Book Publishing Co. (1980), it is known that the rheology of an aqueous medium can be modified by the addition of a water-soluble gum or resin hereinafter called water-soluble polymer. Such water-soluble polymers include polyacrylamide, acrylamide/acrylic acid copolymer, sodium polyacrylate, carboxymethyl cellulose, hydroxyethyl cellulose, methyl cellulose, polysaccharide as well as naturally occurring gums such as guar gum and chemically modified gums such as hydroxypropyl guar gum. As a result of this capability, there are many existing, as well as potential, industrial applications for controlling rheology of aqueous media with such water-soluble polymers. These applications include (1) drag reduction fluids to reduce energy required to pump aqueous fluids through pipes and other conduits, (2) thickening formulations to improve various properties such as liquid flow, handling and the like, and (3) formulations to control droplet size in agricultural sprays to reduce spray drift.

Unfortunately, however, the aforementioned conventional water-soluble polymers suffer from many serious deficiencies or limitations in actual use in such industrial applications. For example, for reasons of efficiency and economical considerations, it is common to employ very high molecular weight versions of such polymers. However, during many industrial applications, the conditions present during the practice of the application involve exposing an aqueous medium containing the high molecular weight water-soluble polymer to high shear. Such shear often causes mechanical degradation of the polymer and thus reduces the viscosity of the aqueous medium. While lower molecular weight polymers are less sensitive to shear degradation, they must be used in much higher concentrations in order to achieve the desired level of viscosity.

Secondly, while ionic water-soluble polymers such as neutralized acrylamide/acrylic acid copolymer, sodium polyacrylate, polystyrene sulfonate and the like are more efficient thickeners in deionized water than their nonionic counterparts, their thickening ability is greatly reduced by the presence of electrolytes such as sodium chloride, calcium chloride and magnesium sulfate in the aqueous medium. Such electrolytes are present in the aqueous media employed in most industrial applications, particularly those requiring the use of ground waters in subterranean formations as in enhanced oil recovery.

Finally, in many applications, the aqueous medium thickened with water-soluble polymer is exposed to temperatures in the range of 30° C. to 100° C. which normally causes reduction of viscosity. Such high temperatures are particularly common in enhanced oil recovery applications wherein the aqueous medium is pumped underground to depths of 5,000 to 20,000 feet, as is common for mobility control fluids and packing fluids.

In attempts to overcome some of the aforementioned deficiencies of the conventional water-soluble polymers, it has been a common practice to cross-link the polymer in order to improve resistances to thermal as well as shear degradation. See, for example, U.S. Pat. No. 3,247,171. Such attempts have generally not been successful. More recently, as taught in U.S. Pat. No. 3,984,333, an aqueous medium has been thickened by dissolving a water-soluble block polymer having water-soluble blocks and water-insoluble blocks in the aqueous medium. While such water-soluble block polymers apparently exhibit reasonably good resistance to shear degradation, such polymers are difficult and often impractical to prepare. More importantly, such polymers do not exhibit significant tolerance to electrolytes normally present in the aqueous media to be thickened.

While the cellulosic derivatives such as hydroxyethyl cellulose and biopolymers exhibit acceptable tolerance to the presence of electrolytes, cellulosic derivatives are generally ineffective at the low concentrations that are economical and exhibit poor thermal stability. The biopolymers such as xantham gums exhibit acceptable thermal stability, resistance to shear degradation and electrolytic tolerance. Unfortunately, such biopolymers are generally very expensive and are susceptible to biodegradation.

In view of the aforementioned deficiencies of conventional water-soluble polymers, it is highly desirable to provide a relatively inexpensive polymer which provides rheological control in aqueous media and exhibits thermal stability, electrolytic tolerance and good resistance to shear and biological degradation.

SUMMARY OF THE INVENTION

In one aspect, the present invention is a water-dispersible triblock polymer of the BAB type. The B block is an alkyl group having at least 4 carbons, a hydrophobic polymer having a polyethylenic backbone having a plurality of pendant aliphatic hydrophobic moieties which are capable of hydrophobe association in an aqueous medium or a combination of the alkyl and the hydrophobic polymer. The A block is a polymer having a polyethylenic backbone having a plurality of pendant hydrophilic moieties. The size of individual A blocks and B blocks and the proportion of total A block to total B block in the polymer are such that the polymer is water-dispersible and exhibits the ability to associate with hydrophobe moieties in aqueous media.

Surprisingly, aqueous media containing the triblock polymer of this invention can be subjected to substantial mechanical shear without experiencing as much loss in viscosity as conventional water-soluble polymers. Moreover, such triblock polymers provide a substantial viscosity increase even when the aqueous medium contains significant concentration of electrolyte as in the case of hard water or brine and even when exposed to temperatures up to 80° C. Consequently, such polymers can be used for a variety of applications wherein high temperatures, substantial electrolyte concentrations and conditions of high mechanical shear such as in high shear pumping of the aqueous medium is required. As a result of these and other thickening characteristics of the present invention, these polymers are useful in all applications which require aqueous media having increased viscosity such as drilling mud formulations, fracturing fluids, liquid mobility control agents, aqueous solutions of inorganic salts, hydraulic fluids, lubricants, friction reducing agents, suspending agents, aqueous suspensions of insoluble particulates such as paint formulations and the like. Such polymers are also useful in applications which require drag reduction, droplet size control and control of other rheological properties characteristic of water-soluble gums and resins.

Accordingly, in another aspect, the present invention is an aqueous medium containing an amount of the triblock polymer which affects the rheology of the aqueous medium, preferably that which is effective to control the rheology of the aqueous medium. In a preferred embodiment in this aspect of the invention, the aqueous medium containing the polymer and a surfactant having hydrophobic moieties capable of association with the hydrophobic moieties of the polymer, is a mobility control fluid useful in enhanced oil recovery operations. In the practice of this embodiment of the invention, the thickened aqueous medium is introduced through an injection well into a porous subterranean formation penetrated by said well and driven through the formation to the producing well.

In other aspects of this invention, the thickening agent is employed in a drilling mud formulation or a fracturing fluid wherein the thickening agent is present in an amount sufficient to increase the viscosity of the formulation or fluid as desired. In a further aspect, this invention is an aqueous medium containing a drag reducing agent comprising the aforementioned triblock polymer alone or in combination with a surfactant having hydrophobic moieties capable of associating with the hydrophobic moieties of the triblock polymer or a water-soluble electrolyte or both the surfactant and the electrolyte. When present in the aqueous medium, this drag reduction agent effectively reduces pipe flow friction when the aqueous medium is transported through pipelines as in district heating, liquid slurry transport and the like. In yet a further aspect, this invention is an aqueous spray formulation containing the aforementioned polymer alone or in combination with a surfactant and/or an electrolyte as an agent to control droplet size in agricultural applications or in the cutting or grinding of metals to prevent misting of the aqueous medium. In yet other aspects, the block polymer or thickening agent is employed in a lubricant or similar applications requiring rheology control.

DETAILED DESCRIPTION OF THE ILLUSTRATIVE EMBODIMENTS

The BAB triblock polymer of this invention has hydrophobic moieties and exhibits hydrophobe association capabilities when dispersed in an aqueous medium. For purposes of this invention, such a polymer is one which, when mixed with water, the resulting mixture is transparent or translucent, and not milky white as in the case of a dispersion of a water-insoluble polymer. Such a polymer is water-dispersible for the purposes of this invention if it forms a clear solution in an aqueous solution of one weight percent of octanol condensed with 5 moles of ethylene oxide ($C_8(EO)_5$). By "hydrophobe association capability", it is meant that an aqueous medium containing a viscosity enhancing (increasing) amount of the block polymer shows greater viscosity than that of an aqueous medium containing a similar amount of a homopolymer of the water-soluble monomer forming A-block wherein the homopolymer has a molecular weight similar to that of the triblock polymer. Most preferably, the polymer has, when dispersed in an aqueous medium, the ability to associate with hydrophobic moiety of a surfactant or other chemical in an aqueous medium and thereby exhibit even further enhancement of viscosity. This associative property is preferably exhibited in the presence of dissolved electrolyte such as a salt of an alkali metal or alkaline earth metal, particularly in aqueous media containing from about 0.01 to about 20 weight percent of such salts. In fact, the preferred triblock polymers of this invention remain in solution, i.e., they do not precipitate or undergo a phase separation in the aqueous medium when the electrolyte is added to the medium.

The molecular weight of the triblock polymer is low enough such that an aqueous medium containing 0.1 weight percent of the polymer can be subjected to a degree of shear on the order of 10,000 sec$^{-1}$ without causing the polymer to degrade significantly. Moreover, the polymer has a molecular weight such that, when 0.5 weight part of the polymer is dissolved in 100 weight parts of water, the Brookfield viscosity of the water is increased to at least 2 centipoises (as measured using a Brookfield LVT viscometer equipped with a UL adaptor and operated at 6 rpm and 25° C.). While polymers having very high molecular weight, e.g., weight average molecular weight ($M_w$) greater than 5 million, can be suitably employed, such polymers tend to degrade when subjected to high shear, e.g., in excess of 10,000 sec$^{-1}$. Accordingly, such polymers are less preferred for some applications. Preferably, the triblock polymers used in this invention have weight average molecular weights ($M_w$) as determined by gel permeation chromatography in the range from about 100,000 to about 2 million, most preferably from about 500,000 to about 1 million.

In the BAB triblock polymer, the concentration of the water-insoluble B block is sufficient to provide the polymer with hydrophobe association capability, preferably a concentration in the range from about 0.1 to about 20 mole percent, most preferably in the range from about 0.1 to about 2 mole percent. The concentration of water-soluble A block is sufficient to enable the triblock polymer to be water-dispersible, preferably a concentration in the range from about 99.9 to about 80 mole percent, most preferably in the range from about 99.9 to about 98 mole percent.

Examples of preferred B blocks include hydrophobic caps such as dodecyl, octadecyl and other alkyls having from 4 to 36 carbons, more preferably from 8 to 20 carbons, most preferably from 12 to 18 carbons; and poly(ar-monovinyl-ar-(higher alkyl)arenes) and sulfonated poly(ar-monovinyl-ar-(higher alkyl)arenes) such as unsulfonated and sulfonated homopolymers and copolymers of t-butylstyrene, amylstyrene, dodecylstyrene, octadecyl-, tetradecyl- and hexadecyl-, wherein higher alkylstyrene has from 4 to 18 carbons, most preferably from 4 to 8 carbons. Of these preferred B blocks, the sulfonated polymerized poly(t-butylstyrene) is most preferred. In the preferred B blocks, the mole ratio of sulfo moiety to aromatic moiety is from about 0:1 to about 1:1, more preferably from about 0.2:1 to 0.75:1, most preferably about 0.75:1.

Examples of preferred A blocks include water-soluble sulfonated polystyrene and water-soluble sulfonated poly(ar-substituted styrenes) wherein the substituent is methyl or halo such as bromo or chloro, with sulfonated poly(vinyltoluene) and sulfonated polystyrene being most preferred. In the preferred A blocks, the mole ratio of sulfo moiety to aromatic moiety is from about 0.75:1 to about 1:1, most preferably from 0.8:1 to 1:1.

The preferred BAB triblock polymers are advantageously prepared by (1) following the anionic polymerization process described in *Developments in Polymerization—I,* Chapter 1, "Anionic Polymerization" by D. H. Richards, Applied Science Publishers LTD, London (1979) using an appropriate mixture of aromatic monomers and an alkali naphthalene initiator in tetrahydrofuran and (2) sulfonating the resulting triblock polymer dissolved in a halohydrocarbon under the conditions described in U.S. Pat. No. B 3,072,618.

The amount of BAB triblock polymer employed in an aqueous medium is that which is sufficient to provide the desired rheological property to the medium. Preferably such amounts are in the range from about 0.0001 (100 ppm) to about 5 weight percent, most preferably from about 0.00025 (250 ppm) to about 1 weight percent, based on the aqueous medium.

In especially preferred embodiments, a water-dispersible surfactant having hydrophobic moieties capable of associating with the hydrophobic moieties of the BAB triblock polymer is employed in an amount to further enhance the viscosity of the aqueous medium containing the copolymer. Such further enhancement of viscosity can be particularly effective when the aqueous medium contains a significant amount of a water-soluble electrolyte such as sodium chloride and/or other salts of alkali metals or alkaline earth metals such as calcium and magnesium. Such further viscosity enhancement is also observed when the aqueous medium is heated to temperatures from about 60° C. to about 80° C. When the surfactant is employed, it is preferably employed in an amount from about 0.1 to about 20, more preferably from about 0.5 to about 10, most preferably from about 0.1 to about 2, weight parts per weight part of the triblock polymer.

Surfactants suitably employed in combination with the BAB triblock polymer are those micelle-forming surface active agents which will disperse in an aqueous medium containing an effective amount of the aforementioned polymer and which have sufficient hydrophobic moieties to combine with the polymer to increase the viscosity of an aqueous medium containing said polymer. Preferably, the surfactant will also increase the viscosity of an aqueous medium containing an electrolyte, e.g., a one percent concentration of sodium chloride, in addition to the triblock polymer. Accordingly, such surfactants can be nonionic, anionic or amphoteric surfactants having associative hydrophobic moieties, with the nonionic surfactants being preferred due to their ability to remain hydrated in the presence of significant electrolyte concentration.

Preferred nonionic surfactants have hydrophilic-lipophilic balances (HLB) in the range from about 2 to about 15, more preferably from about 5 to about 13, most preferably from about 6.5 to about 10.9. Exemplary surfactants include nonionic surfactants such as the reaction products of ethylene oxide or mixtures of ethylene oxide and higher alkylene oxide with active hydrogen compounds such as phenols, alcohols, carboxylic acids and amines, e.g., alkylphenoxyethyleneoxy ethanols. Preferred nonionic surfactants are the alkyl polyethyleneoxy compounds represented by the formula:

RO(EO)$_n$—H wherein R is $C_8$–$C_{18}$ alkyl, more preferably a $C_{12}$ to $C_{14}$ alkyl, most preferably a $C_{12}$ alkyl, EO is ethyleneoxy and n is a number from 1 to 10, more preferably 2 to 8, most preferably about 5.

Suitable, but less preferred than the nonionic surfactants, are anionic-substituted polyethyleneoxy compounds represented by the formula:

RO(EO)$_n$—X wherein R and n are as defined hereinbefore, EO is ethyleneoxy and X is $SO_3H$, $CO_2H$ or $PO_3H$; salts of long chain carboxylates such as potassium oleate, sodium laurate, potassium stearate, potassium caprolate, sodium palmatate and the like; alkali metal alkylbenzene sulfonates such as sodium nonylbenzene sulfonate and potassium dodecylbenzene sulfonate; alkali metal alkyl sulfates such as sodium dodecyl sulfate and alkali metal dialkyl sulfosuccinates such as sodium dihexyl sulfosuccinate and sodium dioctyl sulfosuccinate; salts of resin acids such as abietic acid and dihydroabietic acid. Other suitable surfactants include anionic and nonionic surfactants described in *McCutcheon's Detergents and Emulsifiers,* North American Edition, 1980 Annual. Of the forgoing surfactants, the nonionic types are preferred, with ethoxylated alkyl phenol and ethoxylated fatty alcohols being most preferred.

The triblock polymers of this invention are particularly effective for controlling rheology of aqueous media containing non-polymeric, water-soluble electrolytes including salts of monovalent and divalent cations such as ammonium, alkali metal and alkaline earth metal chlorides, bromines, nitrates, sulfates, carbamates, acetates and the like; monobasic and di- and tribasic acids such as hydrochloric acid, sulfuric acid, phosphoric acid and oxalic acid; and monovalent bases such as sodium hydroxide and potassium hydroxide. Such electrolytes may be present in the aqueous media as in the case of brines and other aqueous media containing water-soluble salts of various metals and other water-soluble electrolytes. Such aqueous media often contain from about 0.01 to about 20 weight percent of salts of alkali metals such as sodium chloride and potassium chloride and alkaline earth metals such as calcium and magnesium chloride.

The following examples are given to illustrate the invention and should not be construed as limiting its scope. Unless otherwise indicated, all parts and percentages are by weight. In these examples, all reagents and reaction vessels are treated to remove water and other proton donors. All reactions are carried out under dry nitrogen.

EXAMPLE 1

A. Initiator Preparation

To a 0.5-liter flask equipped with a stirrer, nitrogen bubbler and an inlet port are added 3.9 g of naphthalene and 150 g of distilled tetrahydrofuran by a syringe. About 2 g of potassium is then added to the contents of the flask with stirring under high nitrogen flow. This mixture is allowed to react overnight. A weighed amount of this mixture is reacted with dry butyl bromide and the resulting bromide ions are titrated with a standard $AgNO_3$ solution. The resulting concentration of initiator is 0.181 milliequivalents/gram.

B. Polymerization

To a 1.0-liter flask equipped with a stirrer, nitrogen bubbler, thermometer, glass stirrer and an inlet port is added 72.84 g (0.62 mole) of vinyltoluene. To the flask is then added 400 g of distilled tetrahydrofuran with stirring, and the resulting mixture is cooled to about −60° C. to −70° C. The mixture is then contacted with 0.9 ml of 0.5N n-butyl lithium in benzene to remove water and any other proton donors. To this mixture is added 0.68 g of the aforementioned initiator and the mixture exhibits an immediate increase in viscosity.

One hour after addition of the initiator, 1.92 g (0.012 mole) of degassed t-butylstyrene is added dropwise with stirring to the reaction mixture which then exhibits a substantial increase in viscosity. After 15 minutes of further reaction, 0.5 ml of glacial acetic acid is added to terminate polymerization. Following washing from the flasks with tetrahydrofuran and removal of solvent by heating at 70° C. for 36 hours in a vacuum oven and at 90° C. for 48 hours, 74.4 g of t-butylstyrene/vinyltoluene/t-butylstyrene (TBS/VT/TBS) triblock polymer is recovered and ground into a coarse powder. Determination of molecular weight of the triblock polymer by gel permeation chromatography using a polystyrene standard indicates an $M_n$ of 787,000, $M_w$ of $1.03 \times 10^6$, and $M_z$ of $1.26 \times 10^6$. The mole ratio of monomeric components is 100 TBS/10,000 VT/100 TBS.

C. Sulfonation

A solution of 10 g of the triblock polymer in 190 g of ethylene dichloride is added dropwise over a period of 22 minutes to a 0.5-liter flask containing 15 g of triethylphosphate, 13.8 ml of sulfur trioxide and 200 g of ethylene dichloride while stirring the contents of the flask at <40° C. The reaction mixture is stirred at <40° C. for 90 minutes and then filtered through a sintered glass vacuum filter to remove polymer. The polymer is washed twice with 50–100 ml of ethylene dichloride per wash. The sulfonated copolymer is dissolved in 800 ml of a 50/50 solution of methanol and methyl ethyl ketone and then precipitated in salt form by titrating to a phenolphthalein end point with an aqueous solution of 50 percent NaOH. The precipitate is dried overnight at 70° C. in a vacuum oven and then subjected to dialysis to remove sodium sulfate. Sulfur analysis by combusting in oxygen using 0.5 percent NaOH in water as an absorbing solution and analyzing the absorbing solution for sodium sulfate by ion chromatography indicates a 12.9 percent sulfur for a sulfonation of 89 percent.

Viscosity Determination

In the preparation of the aqueous solutions to be tested for viscosity, the solution of triblock polymer is first diluted to 1 percent concentration and maintained at 70° C. overnight. Portions of this solution are then combined with surfactant or surfactant and salt to form solutions which are allowed to equilibrate at room temperature (∼30° C.) for over 48 hours. Aqueous solutions of this sulfonated polymer as well as combinations with surfactant and salt are then tested for viscosity and the results are reported in Table I.

TABLE I

| Sample No. | Polymer, Conc., % | Surfactant[2] Type | Conc., % | NaCl Conc., % | Temp °C. | Viscosity[3], cps at Shear Rate[3], sec$^{-1}$ | | | |
|---|---|---|---|---|---|---|---|---|---|
| | | | | | | 43 | 345 | 1380 | 5390 |
| 1 | 1 | None | 0 | 0 | 25 | 56.1 | 28.7 | 17.3 | 9.8 |
| | | | | | 40 | 37.9 | 21.3 | 13.6 | 8.0 |
| | | | | | 55 | 29.2 | 15.5 | 9.9 | 6.3 |
| 2 | 1 | $C_8(EO)_5$ | 0.1 | 0 | 25 | 25.4 | 15.6 | 11.0 | 7.2 |
| | | | | | 40 | 20.9 | 12.2 | 8.6 | 5.8 |
| | | | | | 55 | 14.4 | 9.4 | 6.9 | 4.9 |
| | | | | | 70 | 13.3 | 8.2 | 5.8 | 4.3 |
| 3. | 1 | $C_{12}(EO)_5$ | 0.1 | 0 | 25 | 37.2 | 20.0 | 13.2 | 7.7 |
| | | | | | 40 | 33.8 | 17.3 | 11.3 | 6.7 |
| | | | | | 55 | 37.2 | 17.1 | 10.9 | 6.4 |
| | | | | | 70 | 53.5 | 18.3 | 10.7 | 5.9 |
| 4 | 1 | $C_{12}(EO)_2$ | 0.1 | 0 | 25 | 128.2 | 43.6 | 23.3 | 11.2 |
| | | | | | 40 | 74.0 | 32.4 | 18.4 | 9.4 |
| | | | | | 55 | 59.6 | 26.5 | 15.2 | 7.8 |
| | | | | | 70 | 43.2 | 19.8 | 10.8 | 6.2 |
| 5 | 1 | $C_8(EO)_5$ | 0.1 | 2 | 25 | 31.5 | 14.1 | 7.8 | 5.2 |
| | | | | | 40 | 20.5 | 9.8 | 6.3 | 4.4 |
| | | | | | 55 | 22.8 | 9.6 | 5.7 | 3.9 |
| | | | | | 70 | 22.8 | 9.6 | 5.7 | 3.9 |
| 6 | 1 | $C_{12}(EO)_5$ | 0.1 | 1 | 25 | 70.2 | 20.2 | 10.7 | 6.5 |
| | | | | | 40 | 47.8 | 16.2 | 8.9 | 5.3 |
| | | | | | 55 | 47.0 | 14.7 | 7.7 | 4.7 |
| | | | | | 70 | 44.0 | 13.0 | 6.5 | 4.0 |

[2], [3]Same as [2, 3] in Table II with the addition that $C_{12}(EO)_2$ is Bi(oxethylene)dodecyl alcohol.

In the foregoing Table I, all concentrations are by weight and are based on the total weight of the solution being tested for viscosity. As evidenced by the data of Table I, the solutions of Sample Nos. 3, 4 and 6 containing a $C_{12}(EO)_5$ or $C_{12}(EO)_2$ surfactant as well as the triblock polymer retain their ability to control rheology of the solution at higher temperatures, e.g., 55° C., than does the solution (Sample No. 1) which contains no surfactant. In addition, it is observed that the solutions (sample Nos. 3, 4 and 6) containing $C_{12}(EO)_5$ and $C_{12}(EO)_2$ as well as Sample No 1 containing surfactants exhibit better hydrophobic associative properties than do solutions (Sample Nos. 2 and 5) containing the $C_8(EO)_5$ surfactant.

EXAMPLE 2

Following the procedures of the foregoing example except using octadecyl bromide instead of acetic acid as the capping agent, a polymer is prepared and sulfonated. The sulfonated polymer has a sulfonated A block of about 1,000 mers of vinyl toluene and 2 sulfonated B blocks of up to 100 mers of t-butylstyrene per block which B blocks are capped with octadecyl bromide. A 1.0-g portion of the sulfonated triblock polymer is dissolved in 98.0 g of deionized water, containing 1.0 g of penta(oxyethylene)octyl alcohol [$C_8(EO)_5$ having an HLB of 12.6] or 1.0 g of penta(oxyethylene)dodecyl alcohol [$C_{12}(EO)_5$ having an HLB of 10.9]. The viscosity of the resulting solutions (Sample Nos. 2 and 5) are measured at 25° C. as a function of shear rate using a Haake Rotovisco ® Model RV-3 rotational viscometer having an NV system. The results are reported in Table II.

For purposes of comparison, other copolymers (Sample Nos. 3 and 6) prepared generally according to the foregoing procedure except that different amounts of monomers are employed are similarly tested for viscosity at different shear rates. The results of these tests are reported in Table II. Also, a sulfonated polymer of vinyltoluene capped with a higher alkyl bromide (Sample Nos. 1 and 4 and 7) is similarly tested and the results are reported in Table II.

TABLE II

| Sample No. | TBS/VT/TBS Copolymer[1] | Surfactant[2] Type | % | Shear Rate[3] $sec^{-1}$ | Viscosity[3] cps |
|---|---|---|---|---|---|
| 1 | $C_{18}/0/1000/0/C_{18}$ | $C_8(EO)_5$ | 1 | 345 | 7.6 |
|   |   |   |   | 1380 | 7.8 |
|   |   |   |   | 3900 | 6.6 |
| 2 | $C_{18}/20/1000/20/C_{18}$ | $C_8(EO)_5$ | 1 | 345 | 9.1 |
|   |   |   |   | 1380 | 8.2 |
|   |   |   |   | 3900 | 7.5 |
| 3 | $C_{18}/100/1000/100/C_{18}$ | $C_8(EO)_5$ | 1 | 345 | 10.3 |
|   |   |   |   | 1380 | 10.2 |
|   |   |   |   | 3900 | 8.8 |
| 4 | $C_{18}/0/1000/0/C_{18}$ | $C_{12}(EO)_5$ | 1 | 345 | 19.9 |
|   |   |   |   | 1380 | 17.2 |
|   |   |   |   | 3900 | 13.0 |
| 5 | $C_{18}/20/1000/20/C_{18}$ | $C_{12}(EO)_5$ | 1 | 345 | 40.0 |
|   |   |   |   | 1380 | 24.0 |
|   |   |   |   | 3900 | 17.3 |
| 6 | $C_{18}/100/1000/100/C_{18}$ | $C_{12}(EO)_5$ | 1 | 345 | 89.9 |
|   |   |   |   | 1380 | 44.3 |
|   |   |   |   | 3900 | 25.0 |
| 7 | $C_{18}/0/1000/0/C_{18}$ | $C_{12}(EO)_2$ | 1 | 345 | 30.6 |
|   |   |   |   | 1380 | 22.4 |
|   |   |   |   | 3900 | 15.2 |

[1]$C_{18}/0/1000/0/C_{18}$ represents a sulfonated polymer having about 1000 mers of vinyltoluene (VT) which is capped with octadecanol.
$C_{18}/20/1000/20/C_{18}$ represents a sulfonated triblock polymer having a block of 1000 mers of vinyltoluene and 2 blocks of t-butyl styrene (TBS) of 20 mers per block, wherein the TBS blocks are capped with octadecyl bromide.
$C_{18}/100/1000/100/C_{18}$ represents a sulfonated triblock polymer having a block of 1000 mers of VT and 2 blocks of 100 mers of TBS, wherein the TBS blocks are capped with octadecyl bromide.
[2]$C_8(EO)_5$ - Penta(oxyethylene)octyl alcohol (HLB = 12.6), and $C_{12}(EO)_5$ - Penta(oxethylene)dodecyl alcohol (HLB = 10.9), wherein concentration is based on weight of aqueous solution of polymer.
[3]Shear and viscosity are determined at 25° C. the NV measuring system of the Haake Rotovisco ® Model RV-3, a rotational viscometer.

As illustrated in the foregoing Table II, the preferred triblock polymer (Sample Nos. 1–7) of the present invention exhibit higher viscosities with increasing ratio of hydrophobic (B) blocks to hydrophilic (A) block. In addition, greater viscosity enhancement is seen in the presence of the more hydrophobic ($C_{12}(EO)_5$) surfactant than in the presence of the more hydrophilic ($C_8(EO)_5$) surfactant.

When a triblock polymer having a sulfonated A block of about 1000 mers of vinyl toluene and a B block (cap) of $C_{18}$ alkyl is substituted for the aforementioned triblock polymer of this example, similar hydrophobic associative properties are observed when the $C_{12}(EO)_5$ and $C_{12}(EO)_2$ surfactants are employed. In contrast, however, the combination of this triblock polymer and the $C_8(EO)_5$ surfactant exhibits hydrophobic associative properties that are at least equal to those properties of the triblock polymer alone.

What is claimed is:

1. A water-dispersible BAB triblock polymer comprising (1) B-blocks which are alkyl having at least 4 carbons or a hydrophobic polymer having a polyethylenic backbone having a plurality of pendant hydrophobic aromatic moieties which hydrophobic moieties are capable of hydrophobe association in an aqueous medium or a combination of the alkyl and the hydrophobic polymer and (2) an A-block which is a hydrophilic polymer having a polyethylenic backbone and a plurality of pendant hydrophilic aromatic moieties.

2. A fluid aqueous composition comprising water and an amount of the triblock polymer of claim 1 sufficient to affect the rheology of the aqueous composition.

3. The aqueous composition of claim 2 wherein the amount of the triblock polymer is in the range from about 0.0001 to about 5 weight percent of the aqueous composition.

4. The aqueous composition of claim 2 which also contains a non-ionic or anionic surfactant having hydrophobic moieties capable of associating with the hydrophobic moieties of the triblock polymer.

5. The aqueous composition of claim 3 wherein the surfactant is present in the range from about 0.1 to about 20 weight parts per weight part of the triblock polymer.

6. The aqueous composition of claim 3 which also contains a water-soluble electrolyte.

7. The composition of claim 6 wherein the water-soluble electrolyte is a salt of an alkali metal or alkaline earth metal.

8. The polymer of claim 1 wherein the polymer contains from about 0.1 to about 20 mole percent of B block and from about 99.9 to about 80 mole percent of A block.

9. The polymer of claim 8 wherein the B block is alkyl having 4 to 18 carbons or sulfonated poly(ar-higher alkylstyrene) wherein higher alkyl has from 4 to 18 carbons and A block is sulfonated polystyrene or a sulfonated poly(ar-substituted styrene) wherein the substituent is methyl or halo.

10. An aqueous spray formulation containing an amount of the composition of claim 4 which is sufficient to control droplet size when the formulation is sprayed.

11. An aqueous heat transfer fluid containing the composition of claim 4 in an amount sufficient to reduce flow friction when the fluid is passed through a pipe.

12. A drilling mud formulation containing the polymer of claim 1 in an amount sufficient to control the rheology of the formulation.

13. A mobility control fluid containing the polymer of claim 1 in an amount sufficient to control the rheology of the fluid.

14. A fracturing fluid containing the polymer of claim 1 in an amount sufficient to control the rheology of the fluid.

15. The composition of claim 4 wherein the surfactant is nonionic and the triblock polymer contains from about 0.1 to about 20 mole percent of B block and from about 99.9 to about 80 mole percent of A block.

16. The composition of claim 4 wherein the surfactant is an alkyl polyethyleneoxy compound represented by the formula: $RO(EO)_nH$ wherein R is a $C_8-C_{18}$ alkyl, EO is ethyleneoxy and n is 1 to 10 and the B block of the polymer is alkyl having 4 to 18 carbons or sulfonated poly(ar-higher alkylstyrene) wherein higher alkyl has from 4 to 18 carbons and the A block is a sulfonated polystyrene or sulfonated poly(vinyltoluene).

17. The composition of claim 4 comprising (1) from about 0.00025 to about 1 weight percent of a BAB triblock polymer having from about 80 to about 99.9 mole percent of A block wherein A block is sulfonated poly(vinyltoluene) having a mole ratio of sulfo moiety to aromatic moiety of 0.8:1 to 1:1 and from about 20 to about 0.1 mole percent of B block wherein B block is alkyl having 18 carbons, poly(t-butylstyrene) or sulfonated poly(t-butylstyrene) having a mole ratio of sulfo moiety to aromatic moiety from about 0.2:1 to 0.75:1 and (2) penta(oxyethylene)dodecyl alcohol in an amount from 0.5 to about 10 weight parts per weight part of the triblock polymer.

* * * * *